(12) United States Patent
Kim et al.

(10) Patent No.: US 8,269,907 B2
(45) Date of Patent: Sep. 18, 2012

(54) LIQUID CRYSTAL DISPLAY DEVICE AND METHOD FOR FABRICATING THE SAME

(75) Inventors: Young-Joo Kim, Gyeonggi-Do (KR); Seok-Woo Lee, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 1053 days.

(21) Appl. No.: 11/540,586

(22) Filed: Oct. 2, 2006

(65) Prior Publication Data

US 2008/0002080 A1   Jan. 3, 2008

(30) Foreign Application Priority Data

Jun. 30, 2006   (KR) ........................ 10-2006-0061664

(51) Int. Cl.
*G02F 1/1343* (2006.01)
*G02F 1/136* (2006.01)
(52) U.S. Cl. .............................. 349/43; 349/39; 349/147
(58) Field of Classification Search .............. 349/42–43, 349/46–47, 147, 38–39
See application file for complete search history.

(56) References Cited

U.S. PATENT DOCUMENTS

| 7,405,776 B2* | 7/2008 | Ha et al. .......................... 349/47 |
| 7,528,909 B2* | 5/2009 | Ahn et al. ....................... 349/114 |
| 7,532,263 B2* | 5/2009 | Lee et al. ......................... 349/38 |
| 2004/0233361 A1* | 11/2004 | Ha et al. ......................... 349/114 |
| 2005/0162580 A1* | 7/2005 | Kim et al. ........................ 349/43 |
| 2006/0027812 A1* | 2/2006 | Yang ................................ 257/72 |
| 2006/0050191 A1* | 3/2006 | Park et al. ....................... 349/42 |
| 2006/0102905 A1* | 5/2006 | Park ................................ 257/72 |

FOREIGN PATENT DOCUMENTS

| JP | 2000-236097 | 8/2000 |
| JP | 2003-229433 | 8/2003 |
| JP | 2005-294418 | 10/2005 |
| JP | 2006-139253 | 6/2006 |

* cited by examiner

*Primary Examiner* — Mark Robinson
*Assistant Examiner* — Charles Chang
(74) *Attorney, Agent, or Firm* — Morgan, Lewis & Bockius LLP

(57) ABSTRACT

A method for fabricating is provided for a liquid crystal display device capable of decreasing the number of masks used to fabricate a thin film transistor (TFT) by forming an active pattern and a storage electrode by a single mask process, by simultaneously patterning a pixel electrode at the time of a gate line patterning, and by using only an organic insulation layer having a low dielectric constant.

23 Claims, 16 Drawing Sheets

LIQUID CRYSTAL DISPLAY DEVICE AND METHOD FOR FABRICATING THE SAME

This application claims the benefit of Korean Patent Application No. 10-2006-0061664, filed in Korea on Jun. 30, 2006, which is hereby incorporated by reference.

BACKGROUND OF THE INVENTION

1. Field of the Invention

The present invention relates to a liquid crystal display (LCD) device and a method for fabricating the same, and more particularly, to an LCD device with a simplified fabrication process, enhanced yield, and enhanced brightness and a fabricating method thereof.

2. Description of the Background Art

In the recent information society, a display has become increasingly important as a visual information transmission media. To satisfy this demand, a display should have low power consumption, a thin profile, light weight, and superior picture quality. A liquid crystal display (LCD) device, which is a major product type within the flat panel display (FPD) market, not only satisfies these needs but also enables a mass production so that each kind of new product using the LCD device becomes fast commercialized. As a result, the LCD device is replacing the cathode ray tube (CRT) as the primary display technology.

The liquid crystal display (LCD) device displays an image by individually supplying a data signal to liquid crystal cells arranged in a matrix form according to image information, and by controlling an optical anisotropy of the liquid crystal cells. An active matrix (AM), a main driving method used in LCD technology, drives a liquid crystal of a pixel region using an amorphous silicon thin film transistor (a-Si TFT) as a switching device. The amorphous silicon thin film transistor technique was established by English LeComber in 1979, and commercialized as a 3-inch liquid crystal portable television in 1986. Recently, an LCD of more than 50-inches was developed.

However, a field effect mobility (~1 $cm^2$/Vsec) of the amorphous silicon thin film transistor has a limitation to be used in peripheral circuits requiring a fast operation more than 1 MHz. As a result, development of techniques to simultaneously form a pixel region and a driving circuit region on a glass substrate using polycrystalline silicon (poly-Si) having a field effect mobility greater than that of amorphous silicon is needed.

The polycrystalline silicon thin film transistor technique has been applied to a small type module such as a camcorder since a liquid crystal color television was developed in 1982. Also, the technique has a low photosensitivity and a high field effect mobility so that a driving circuit can be directly fabricated on a substrate.

Increased mobility can increase an operational frequency of the driving circuit region which determines a driving pixel number, thereby facilitating high minuteness of a display device. Also, a signal voltage of the pixel region has a decreased charging time which decreases distortion of a transmitting signal and increases picture quality. When compared with the amorphous silicon thin film transistor having a high driving voltage (~25V), the polycrystalline silicon thin film transistor can be driven under 10V, thereby decreasing power consumption.

Hereinafter, a structure of a related art LCD device will be explained with reference to FIG. 1. FIG. 1 is a plane view showing a structure of a driving circuit integrated LCD device in which a driving circuit region is integrated on an array substrate.

As shown, the LCD device comprises a color filter substrate 5, an array substrate 10, and a liquid crystal layer (not shown) formed between the color filter substrate 5 and the array substrate 10. The array substrate 10 includes a pixel region 35 formed as unit pixels are arranged in a matrix form; and a driving circuit region 30 arranged at an outer periphery of the pixel region 35 having a data driving circuit region 31 and a gate driving circuit region 32. Although not shown, the pixel region 35 of the array substrate 10 includes a plurality of gate lines and data lines for defining a plurality of pixel regions by being arranged horizontally and vertically on the array substrate 10; a thin film transistor (TFT) formed at each intersection between the gate lines and the data lines as a switching device; and a pixel electrode formed at the pixel region. Here, the TFT is a switching device for applying a voltage to the pixel electrode using a field effect transistor (FET) to control a current flow by an electric field.

The driving circuit region 30 of the array substrate 10 is positioned at an outer periphery of the pixel region 35 more protruded than the color filter substrate 5. The data driving circuit region 31 is positioned at a long side of the array substrate 10, and the gate driving circuit region 32 is positioned at a short side of the array substrate 10. The data driving circuit region 31 and the gate driving circuit region 32 use a thin film transistor having a complementary metal oxide semiconductor (CMOS) structure that is an inverter to properly output an input signal. The CMOS is an integrated circuit having an MOS structure used at a driving circuit region TFT that requires a high speed signal processing. The CMOS requires both an n-channel TFT and a p-channel TFT, and has speed and density characteristics corresponding to an intermediate level of an NMOS and a PMOS.

The gate driving circuit region 32 and the data driving circuit region 31 supply a scan signal and a data signal to the pixel electrode through the gate line and the data line, respectively, and are connected to an external signal input port (not shown). The gate driving circuit region 32 and the data driving circuit region 31 control an external signal input through the external signal input port thus to the external sync to the respective pixel electrodes.

A color filter (not shown) for implementing colors and a common electrode (not shown) facing the pixel electrode formed at the array substrate 10 are formed at the pixel region 35 of the color filter substrate 5. The color filter substrate 5 and the array substrate 10 are provided with a cell gap to be separated from each other by a spacer (not shown), and are attached to each other by a seal pattern (not shown) formed at an outer periphery of the pixel region 35 to constitute a unit LC panel. The color filter substrate 5 and the array substrate 10 are attached to each other by a bonding key formed at the color filter substrate 5 or the array substrate 10.

Since the driving circuit integrated LCD device uses a polycrystalline silicon TFT, an excellent device characteristic and a high picture quality are obtained. Accordingly, a high minuteness is implemented and power consumption is decreased.

However, the driving circuit integrated LCD device having an n-channel TFT and a p-channel TFT on the same substrate requires more complicated fabrication process than an amorphous silicon TFT LCD having only a single type channel. That is, to fabricate the array substrate including the polycrystalline silicon TFT, a large number of photolithography processes are required.

The photolithography processes form a desired pattern on a substrate by transferring a pattern from a mask to the substrate, and includes a plurality of processes such as a photoresist depositing process, an exposing process, a developing process, etc. Accordingly, the photolithography process degrades a production yield, and has a high probability of defects in the thin film transistor. Especially, since a mask designed to form a pattern is very expensive, a fabrication cost for an LCD device is increased when the number of masks is increased.

SUMMARY OF THE INVENTION

Accordingly, the present invention is directed to a liquid crystal display device and method for fabricating the same that substantially obviates one or more of the problems due to limitations and disadvantages of the related art.

An object of the present invention is to provide a liquid crystal display (LCD) device that decreases the number of masks used to fabricate a thin film transistor (TFT) by forming an active pattern and a storage electrode by a single mask process, and a fabricating method thereof.

Another object of the present invention is to provide a liquid crystal display (LCD) device that decreases the number of masks by simultaneously patterning a pixel electrode at the time of a gate line patterning, and a fabricating method thereof.

Still another object of the present invention is to provide a liquid crystal display (LCD) device that enhances an aperture ratio.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a method for fabricating a liquid crystal display (LCD) device comprises forming active patterns respectively on a pixel region, a first circuit region, and a second circuit region of a first substrate and forming a storage electrode on the active pattern of the pixel region using a single mask; forming a first insulation layer on the first substrate having the active patterns and the storage electrode; forming a first conductive layer and a second conductive layer on the first insulation layer; patterning the first and second conductive layers in the first circuit region to form a first gate electrode from the second conductive layer; injecting highly-concentrated p+ ions into the active region of the first circuit region to form p+ source/drain regions in the active pattern of the first circuit region; patterning the first and second conductive layers to simultaneously form a second gate electrode from the second conductive layer in the second circuit region, a common line from the second conductive layer in the pixel region and a pixel electrode from the first conductive layer in the pixel region; forming n+ source/drain regions in the active patterns of each of the pixel region and the second circuit region; forming a first inter-insulation layer and a second inter-insulation layer on the first insulation layer, the first gate electrode, the second gate electrode, the common line, and the pixel electrode; forming first contact holes and second contact holes to expose the source regions and the drain regions of the active pattern at the first and second circuit regions by partially removing the first insulation layer, the first inter-insulation layer, and the second inter-insulation layer; forming source electrodes respectively electrically connected to the source regions of the active patterns at the first and second circuit regions through the first contact holes, and forming drain electrodes respectively electrically connected to the drain regions of the active patterns at the first and second circuit regions through the second contact holes; and bonding the first substrate with a second substrate such that a liquid crystal layer is disposed therebetween.

In another aspect, a method for fabricating a liquid crystal display (LCD) device comprises forming active patterns respectively on a pixel region, a first circuit region, and a second circuit region of a first substrate, and simultaneously forming a storage electrode on the active pattern of the pixel region; forming an insulation layer on the first substrate having the active patterns and the storage electrode; forming a conductive layer on the first insulation layer; patterning the conductive layer to form a first gate electrode in the first circuit region, a second gate electrode in the second circuit region, a common line in the pixel region and a pixel electrode in the pixel region; forming p+ source/drain regions in the active region of the first circuit region; forming n+ source/drain regions in the active patterns of each of the pixel region and the second circuit region; forming an inter-insulation layer on the first insulation layer, the first gate electrode, the second gate electrode, the common line, and the pixel electrode; forming first contact holes and second contact holes to expose the source regions and the drain regions of the active pattern at the first and second circuit regions by partially removing the insulation layer and the inter-insulation layer; forming source electrodes respectively electrically connected to the source regions of the active patterns at the first and second circuit regions through the first contact holes, and forming drain electrodes respectively electrically connected to the drain regions of the active patterns at the first and second circuit regions through the second contact holes; and bonding the first substrate with a second substrate such that a liquid crystal layer is disposed therebetween.

In another aspect, a liquid crystal display (LCD) device comprises a first substrate having a pixel region; an active pattern formed on the pixel region; a insulation layer formed on the first substrate having the active pattern; a gate electrode in the pixel region, the active region of the pixel region having source and drain regions formed therein adjacent the gate electrode; a pixel electrode formed in the pixel region, wherein the pixel electrode is formed from a first conductive material disposed in the pixel region and a second conductive material disposed on the first conductive material along edges of the pixel region, and wherein the gate electrode is formed from the second conductive material; an inter-insulation layer formed on the insulation layer, the gate electrode, and the pixel electrode, wherein first and second contact holes are defined through the insulation layer and the inter-insulation layer to the source and drain regions, respectively, and wherein an opening is defined through the inter-insulation layer for opening the pixel region; a source electrode electrically connected to the source region through the first contact hole; a drain electrode electrically connected to the drain region through the second contact hole; a second substrate bonded to the first substrate; and a liquid crystal layer disposed between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Hereinafter, a liquid crystal display (LCD) device and a method for fabricating the same according to the present invention will be explained.

Figure 1:
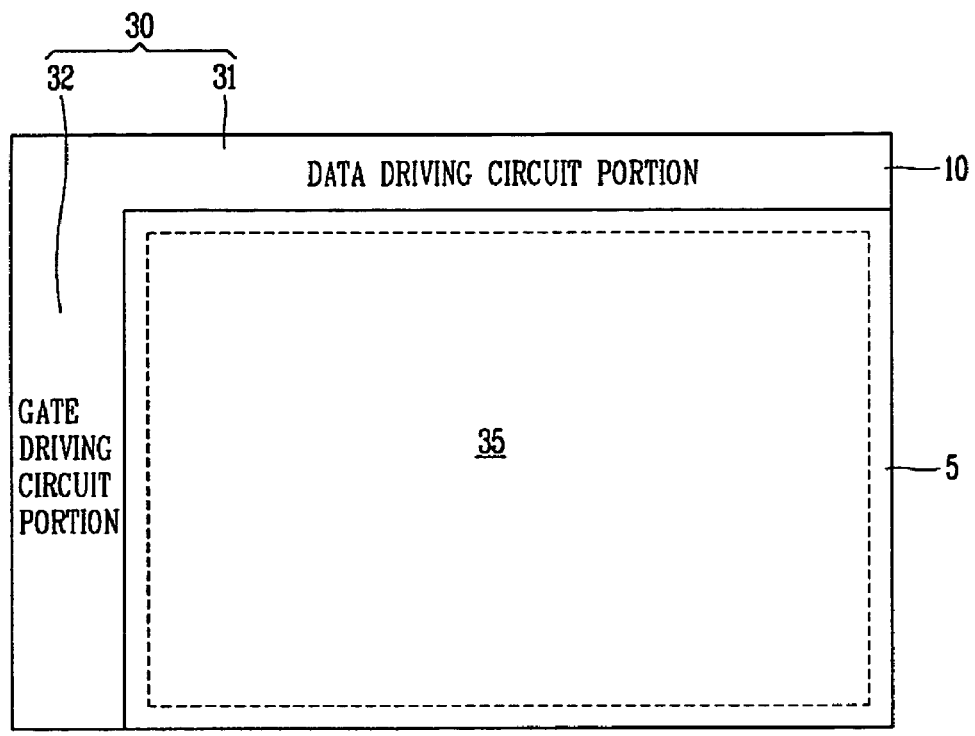
FIG. 1 is a plane view schematically showing a structure of a driving circuit integrated LCD device in accordance with the related art.
Figure 2:
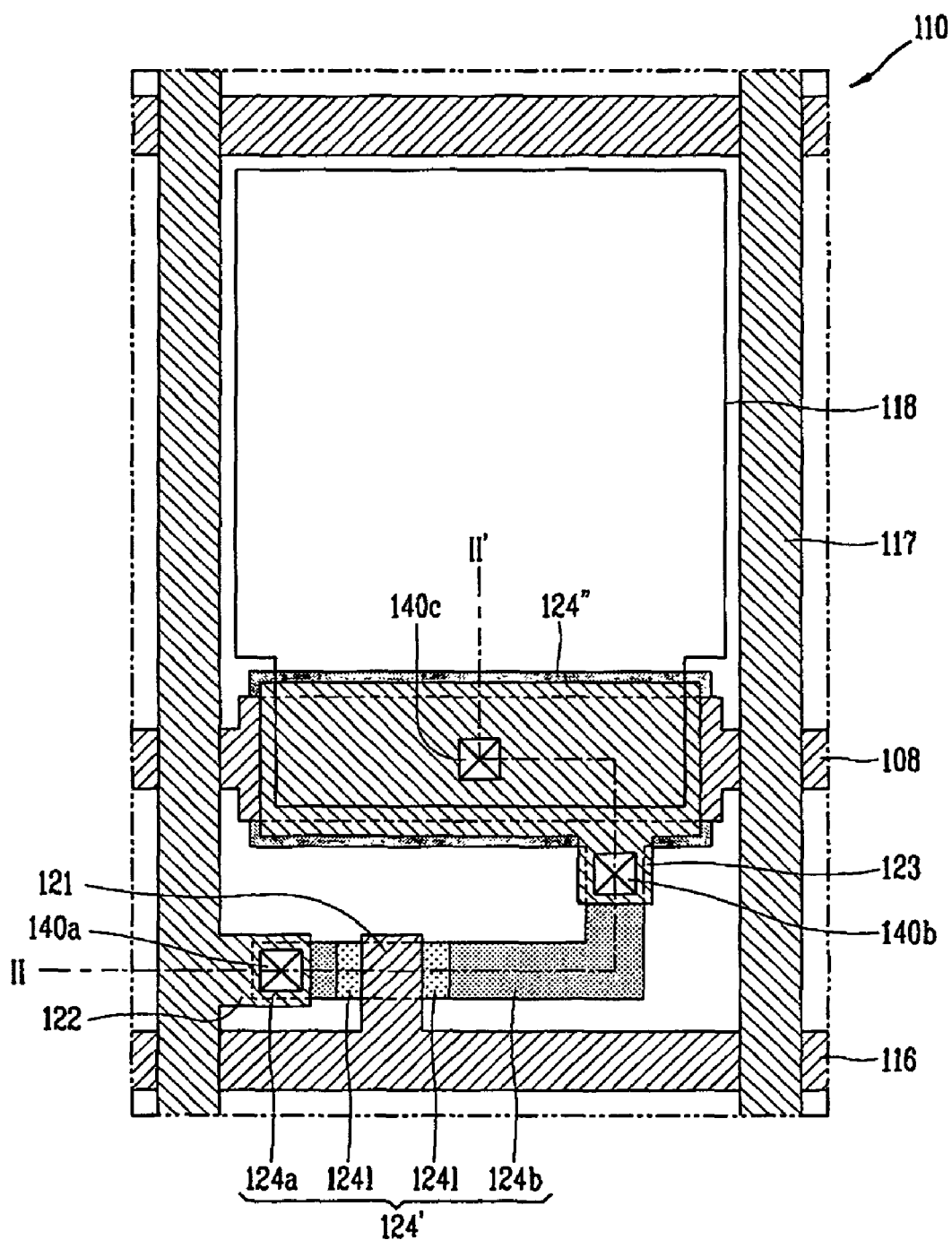
FIG. 2 is a plane view schematically showing an array substrate of an LCD device according to a first exemplary embodiment of the present invention.

FIG. 2 is a plane view schematically showing an array substrate of an LCD device according to a first exemplary embodiment of the present invention showing one pixel of a pixel region including a thin film transistor (TFT). In the LCD device, N gate lines and M data lines cross each other to define M×N pixels. However, only one pixel is shown in FIG. 2 for convenience.

As shown, an array substrate 110 of an LCD device according to the first exemplary embodiment of the present invention comprises a gate line 116 and a data line 117 arranged horizontally and vertically on the array substrate 110 to define a pixel region; a thin film transistor formed at each intersection region of the gate line 116 and the data line 117 as a switching device; and a pixel electrode 118 formed at each pixel region and connected to the TFT for driving a liquid crystal (not shown) together with a common electrode of a color filter substrate (not shown).

The TFT includes a gate electrode 121 connected to the gate line 116, a source electrode 122 connected to the data line 117, and a drain electrode 123 connected to the pixel electrode 118. Also, the TFT includes an active pattern 124' for forming a conductive channel between the source electrode 122 and the drain electrode 123 by a gate voltage supplied to the gate electrode 121.

Herein, the active pattern 124' is formed of a polycrystalline silicon thin film, and extends toward the pixel region thus to be connected to a storage pattern 124" which, together with a common line 108, defines a first storage capacitor. That is, the common line 108 is formed in the same direction as the gate line 116 in the pixel region and overlaps the storage pattern 124" therebelow with a first insulation layer (not shown) being interposed therebetween to define the first storage capacitor. The storage pattern 124" is formed by a doping a polycrystalline silicon thin film used for the active pattern 124' through an additional mask process.

The source electrode 122 and the drain electrode 123 are electrically connected to a source 124a region and a drain region 124b of the active pattern 124' through a first contact hole 140a and a second contact hole 140b formed on the first insulation layer and the second insulation layer (not shown), respectively. A portion of the source electrode 122 extends to contact the data line 117. Also, a portion of the drain electrode 123 extends towards the pixel region to electrically connect the pixel electrode 118 through a third contact hole 140c formed at a third insulation layer (not shown). A portion of the drain electrode 123 extending towards the pixel region overlaps the common line 108 formed therebelow with the second insulation layer being interposed therebetween, thereby constituting a second storage capacitor.

Hereinafter, a process for fabricating the array substrate will be explained. FIGS. 3A to 3I are sectional views sequentially showing fabrication processes taken along line II-II' of the array substrate of FIG. 2 for an array substrate of a pixel region where an n-channel TFT is formed. Herein, an n-channel TFT and a p-channel TFT are formed at the circuit region.

Figure 3A:
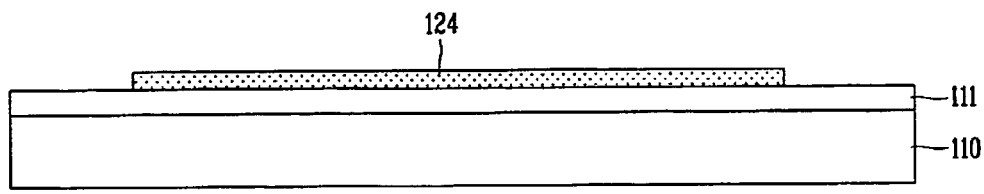
FIGS. 3A to 3I are sectional views sequentially showing exemplary fabrication processes taken along line II-II' of the array substrate of FIG. 2.

As shown in FIG. 3A, a buffer layer 111 and an amorphous silicon thin film are formed on a substrate 110 of a transparent insulating material such as glass. Then, the amorphous silicon thin film is crystallized to form a polycrystalline silicon thin film. Next, the polycrystalline thin film is patterned using a photolithography process (a first mask process), thereby forming a polycrystalline silicon thin film 124 for an active pattern and a storage pattern.

Figure 3B:
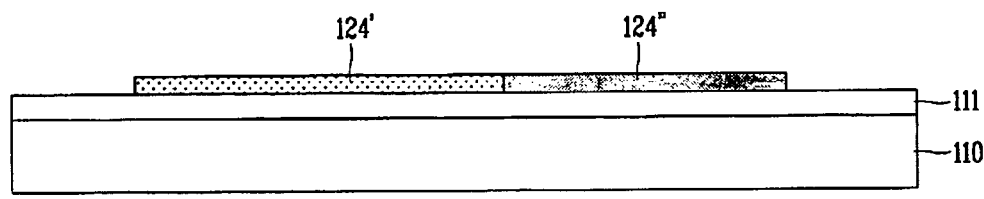

As shown in FIG. 3B, a doping process is performed by shielding a portion of the polycrystalline silicon thin film pattern 124 with a photoresist, thereby forming a storage pattern 124". The polycrystalline silicon thin film 124 shielded by the photoresist forms an active pattern 124', in which an additional photolithography process (a second mask process) is required.

Figure 3C:
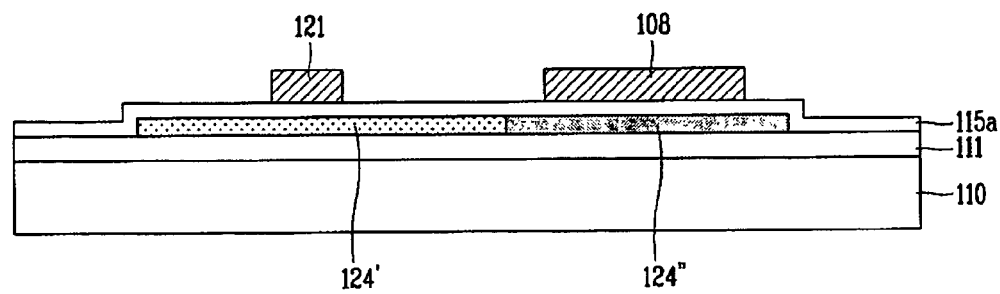

As shown in FIG. 3C, a first insulation layer 115a and a first conductive layer are sequentially formed on an entire surface of the substrate 110. Then, the first conductive layer is selectively patterned using a photolithography process (a third mask process), thereby forming a gate electrode 121 from the first conductive layer remaining on the active pattern 124' and forming a common line 108 from the first conductive layer remaining on the storage pattern 124". Here, the first conductive layer is formed of an opaque conductive material having a low resistance such as a aluminum (Al), aluminum alloy (Al alloy), tungsten (W), copper (Cu), chromium (Cr), or molybdenum (Mo). The common line 108 overlaps the storage pattern 124" therebelow in the pixel region with the first insulation layer 115a interposed therebetween to define the first storage capacitor.

Figure 3D:
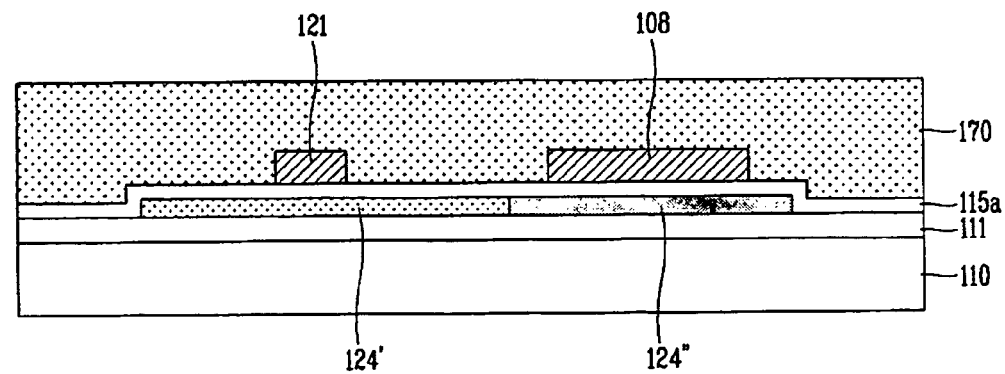

As shown in FIG. 3D, the pixel region of the array substrate 110 and the n-channel TFT region of the circuit region are entirely shielded by a first shielding layer 170 formed of a photoresist (a fourth mask process). Then, a highly-concentrated p+ ion is injected into the p-channel TFT region of the circuit region to form a p+ source region and a drain region.

Figure 3E:
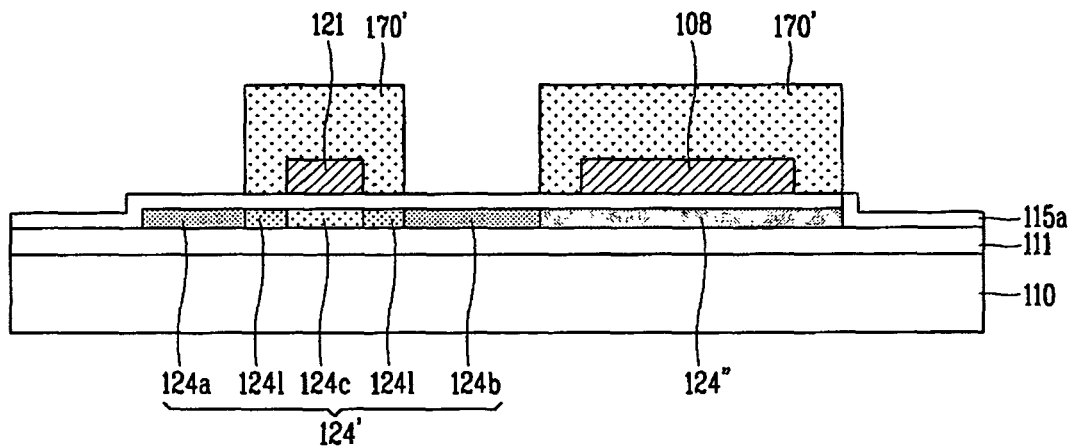

As shown in FIG. 3E, the p-channel TFT region of the circuit region, the n-channel TFT region of the circuit region, the pixel region, and the storage region are shielded by a second shielding layer 170' (a fifth mask process). Then, a highly-concentrated n+ ion is injected into the active pattern 124' of the pixel region, thereby forming an n+ source region 124a and an n+ drain region 124b. A channel region 124c forms a conductive channel between the source region 124a and the drain region 124b. Next, the second shielding layer 170' is removed and n-ions of a low concentration are injected into the entire surface of the substrate 110, thereby forming the n+ source region 124a, the channel region 124c, and a lightly doped drain (LDD) region 1241 between the n+ drain region 124b and the channel region 124c. The storage region can be shielded by the second shielding layer 170' or not shielded. N+ ions are injected into the n-channel TFT region to form an n+ source region 124a, an n+ drain region, and an LDD region 1241.

Figure 3F:
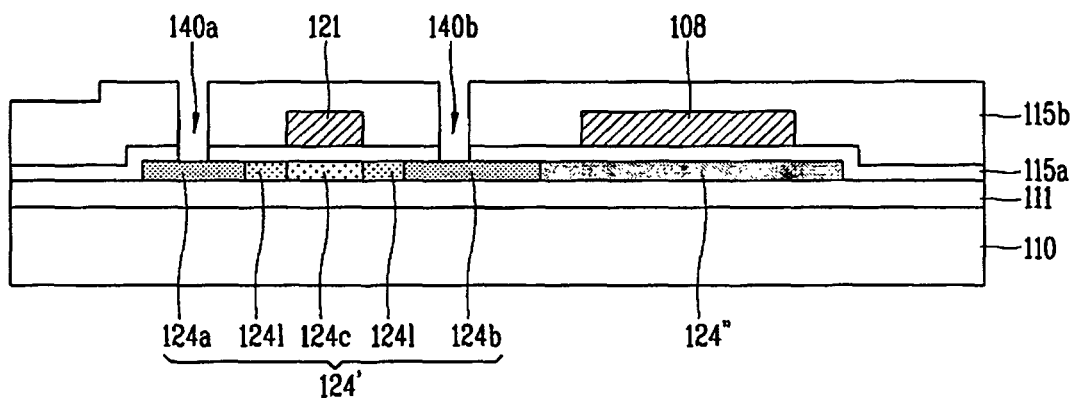

As shown in FIG. 3F, a second insulation layer 115b is deposited on the entire surface of the substrate 110. Then, the first insulation layer 115a and the second insulation layer 115b are partially removed by a photolithography process (a sixth mask process), thereby forming a first contact hole 140a and a second contact hole 140b for partially exposing the source region 124a and the drain region 124b, respectively.

Figure 3G:
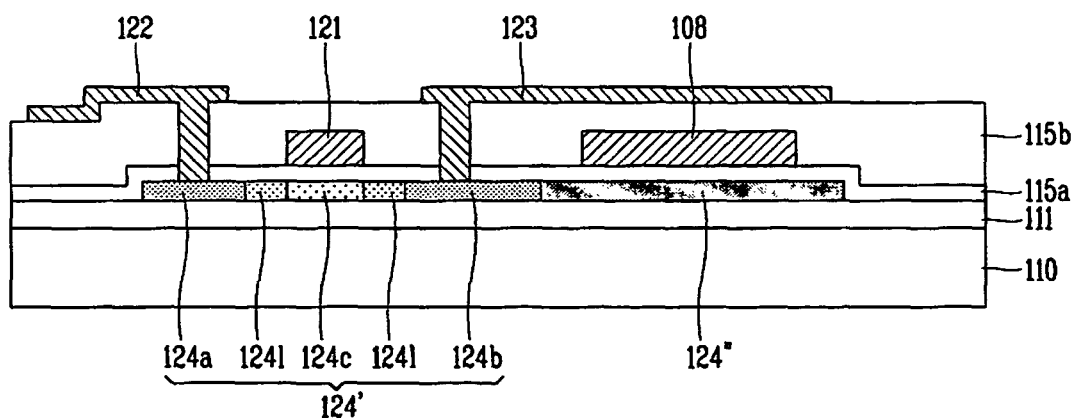

As shown in FIG. 3G, the second conductive layer is formed on the entire surface of the substrate 110 and selectively patterned using a photolithography (a seventh mask process). As the result, a source electrode 122 electrically connected to the source region 124a through the first contact hole 140a, and a drain electrode 123 electrically connected to the drain region 124b through the second contact hole 140b are formed. Herein, a portion of the source electrode 122 extends in one direction to be a part of the data line 117. Also, a portion of the drain electrode 123 extends towards the pixel region to overlap the common line 108 formed therebelow with the second insulation layer 115b being interposed therebetween, thereby forming a second storage capacitor.

Figure 3H:
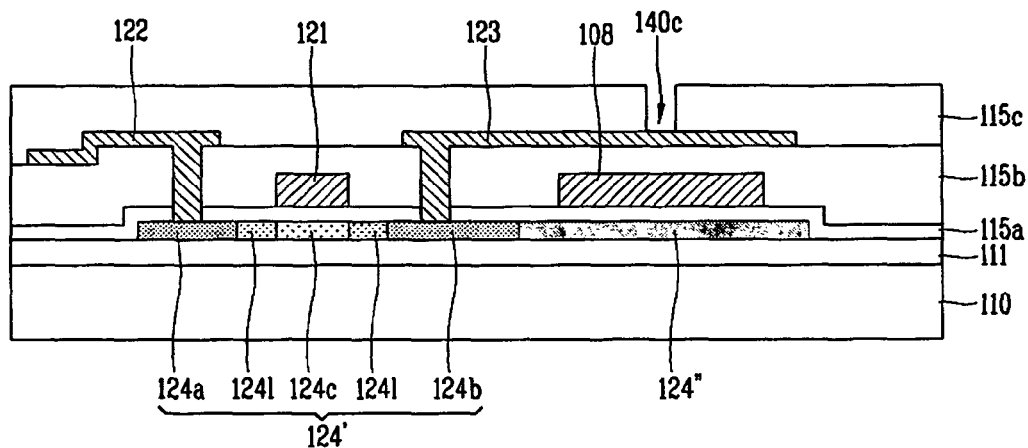

As shown in FIG. 3H, a third insulation layer 115c is deposited on the entire surface of the substrate 110 and selectively patterned using a photolithography process (an eighth mask process), thereby forming a third contact hole 140c for partially exposing the drain electrode 123.

Figure 3I:
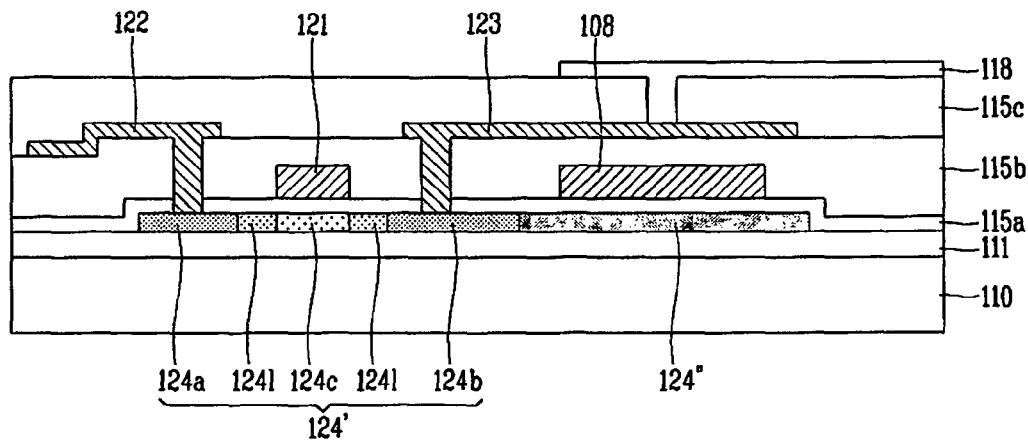

As shown in FIG. 3I, a third conductive layer is deposited on the entire surface of the substrate 110 where the third insulation layer 115c is formed and selectively patterned using a photolithography process (a ninth mask process), thereby forming a pixel electrode 118 electrically connected to the drain electrode 123 through the third contact hole 140c. Here, the third conductive layer can be formed of a transparent conductive material having a high transmittance, such as indium-tin-oxide (ITO) or indium-zinc-oxide (IZO).

In the array substrate according to the first exemplary embodiment of the present invention, the active pattern and the storage pattern are formed of the polycrystalline silicon thin film, and a storage doping is performed on the storage pattern through an additional mask process. Accordingly, the TFT of the pixel region and the circuit region is fabricated through nine mask processes. However, in the second exemplary embodiment of the present invention, the active pattern formed of a silicon thin film and the storage electrode formed of a conductive material are formed through a single mask process using a diffraction exposure. Also, in the second exemplary embodiment, the pixel electrode is simultaneously patterned at the time of patterning gate lines, and the pixel region is opened at the time of forming data lines to expose the pixel electrode outwardly. Accordingly, the number of masks to be used to fabricate the array substrate is reduced.

Figure 4:
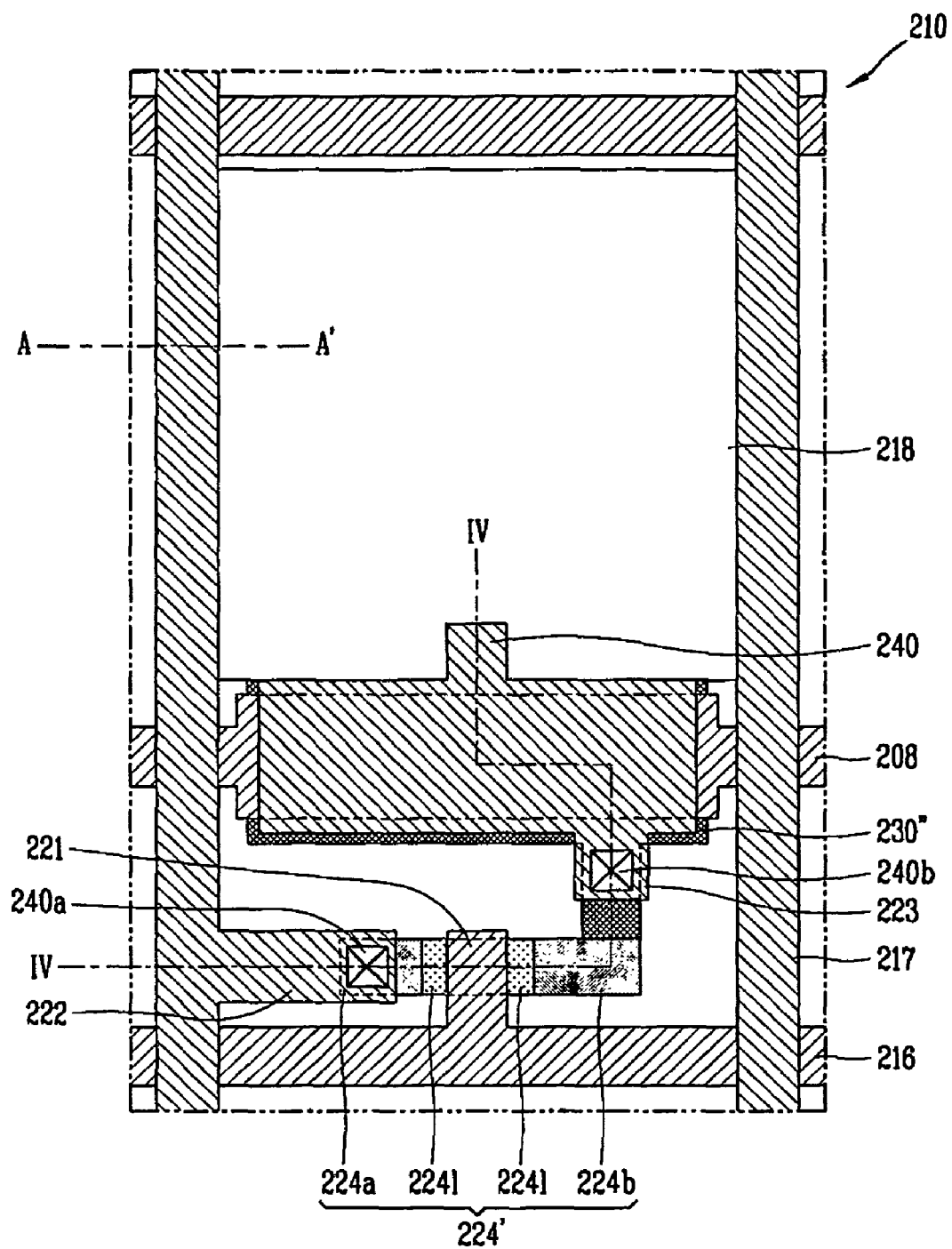
FIG. 4 is a plane view schematically showing an array substrate of an LCD device according to a second exemplary embodiment of the present invention.

FIG. 4 is a plane view schematically showing an array substrate of an LCD device according to a second exemplary embodiment of the present invention which shows one pixel including a TFT of a pixel region. In the LCD device, N gate lines and M data lines cross each other to define M×N pixels. However, only one pixel is shown in FIG. 4 for convenience.

As shown, an array substrate 210 of an LCD device according to the second exemplary embodiment of the present invention comprises a gate line 216 and a data line 217 arranged horizontally and vertically on the array substrate 210 to define a pixel region; a thin film transistor formed at each intersection region of the gate line 216 and the data line 217 as a switching device; and a pixel electrode 218 formed at each pixel region and connected to the TFT for driving a liquid crystal (not shown) together with a common electrode of a color filter substrate (not shown).

The TFT includes a gate electrode 221 connected to the gate line 216, a source electrode 222 connected to the data line 217, and a drain electrode 223 connected to the pixel electrode 218. Also, the TFT includes an active pattern 224' for forming a conductive channel between the source electrode 222 and the drain electrode 223 by a gate voltage supplied to the gate electrode 221.

Herein, the active pattern 224' is formed of a polycrystalline silicon thin film, and extends toward the pixel region. A storage electrode 230" formed of a conductive material is formed on the active pattern 224'. A common line 208 is formed in the same direction as the gate line 216 in the pixel region overlaps the storage pattern 230" therebelow with a first insulation layer (not shown) being interposed therebetween to define a first storage capacitor. The storage pattern 230" of the second exemplary embodiment is formed of an opaque conductive material differently from the first exemplary embodiment and is simultaneously formed with the active pattern 224' by a single mask process.

Below the gate electrode 221, the gate line 216, and the common electrode 208 respectively formed of an opaque conductive material, a gate electrode pattern (not shown), a gate line pattern (not shown), and a common electrode pattern (not shown) are respectively formed of a transparent conductive material and patterned to have the same pattern as the gate electrode 221, the gate line 216, and the common electrode 208, respectively.

The source electrode 222 and the drain electrode 223 are electrically connected to a source region 224a and a drain region 224b of the active pattern 224' through a first contact hole 240a and a second contact hole 240b formed at the first insulation layer, a first inter-insulation layer (not shown), and a second inter-insulation layer (not shown). A portion of the source electrode 222 extends in one direction to be joined with the data line 217. Also, a portion of the drain electrode 223 extends towards the pixel region to constitute a protrusion region 240. The drain electrode 223 is electrically connected to the pixel electrode 218 through the protrusion region 240. While the protrusion region 240 is shown in FIG. 4 at the middle, it can alternatively be formed at other locations, such as the sides. Also, more than one protrusion region 240 may be formed. A portion of the drain electrode 223 extending towards the pixel region overlaps the common line 208 formed therebelow with the first inter-insulation layer and the second inter-insulation layer being interposed therebetween, thereby constituting a second storage capacitor.

The second inter-insulation layer 215b' (of FIG. 5G) according to the second exemplary embodiment may be formed of an organic insulation layer having a low dielectric constant so that the pixel electrode 218 can partially overlap the data line 217. Accordingly, an aperture ratio is enhanced. That is, the pixel electrode 218 according to the present invention is formed below the data line 217 to partially overlap the data line 217. Here, the inter-insulation layer 215b' may be formed using only an organic insulating material.

In the array substrate according to the second exemplary embodiment of the present invention, a conductive material is deposited on the polycrystalline silicon thin film, and the active pattern 224' and the storage electrode 230''' are simultaneously formed through a single mask process using a diffraction exposure. Accordingly, the number of masks is decreased. Furthermore, in the array substrate according to the second exemplary embodiment of the present invention, the pixel electrode 218 is simultaneously patterned at the time of patterning the gate lines (the gate electrode 221, the gate line 216, and the common electrode 208), and the pixel electrode 218 is outwardly exposed by opening the pixel region at the time of forming the data lines (the source electrode 222, the drain electrode 223, and the data line 217). Accordingly, two mask processes for forming the pixel electrode 218 (that is, a mask process for patterning the pixel electrode 218 and a mask process for forming a contact hole to electrically connect the pixel electrode 218 with the drain electrode 223) are not required. As a result, the number of masks is decreased.

FIGS. 5A to 5H are sectional views sequentially showing fabrication processes taken along line IV-IV' of the array substrate of FIG. 4, and FIGS. 6A to 6D are plane views sequentially showing fabrication processes taken along line IV-IV' of the array substrate of FIG. 4.

An n-channel TFT or a p-channel TFT can be formed at the pixel region, and the n-channel TFT and the p-channel TFT are formed at the circuit region to implement a CMOS transistor. A method for fabricating an n-channel TFT of the pixel region, an n-channel TFT of the circuit region, and a p-channel TFT of the circuit region is illustrated in FIGS. 5A to 5H and FIGS. 6A to 6D for convenience.

Figure 5A:
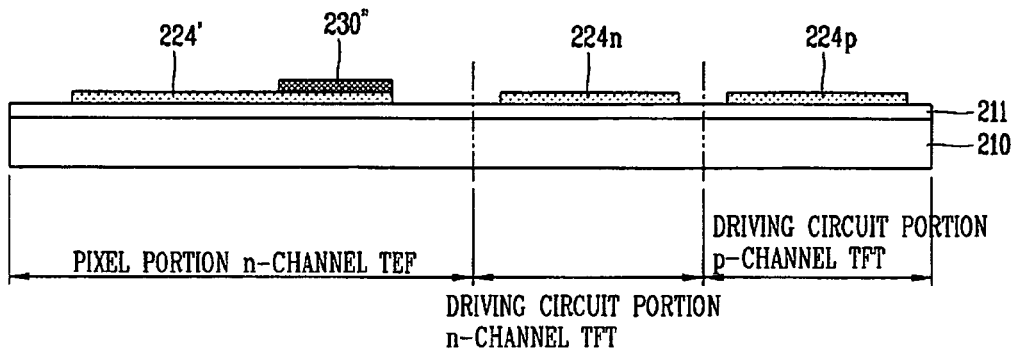
FIGS. 5A to 5H are sectional views sequentially showing exemplary fabrication processes taken along line IV-IV' of the array substrate of FIG. 4.
Figure 6A:
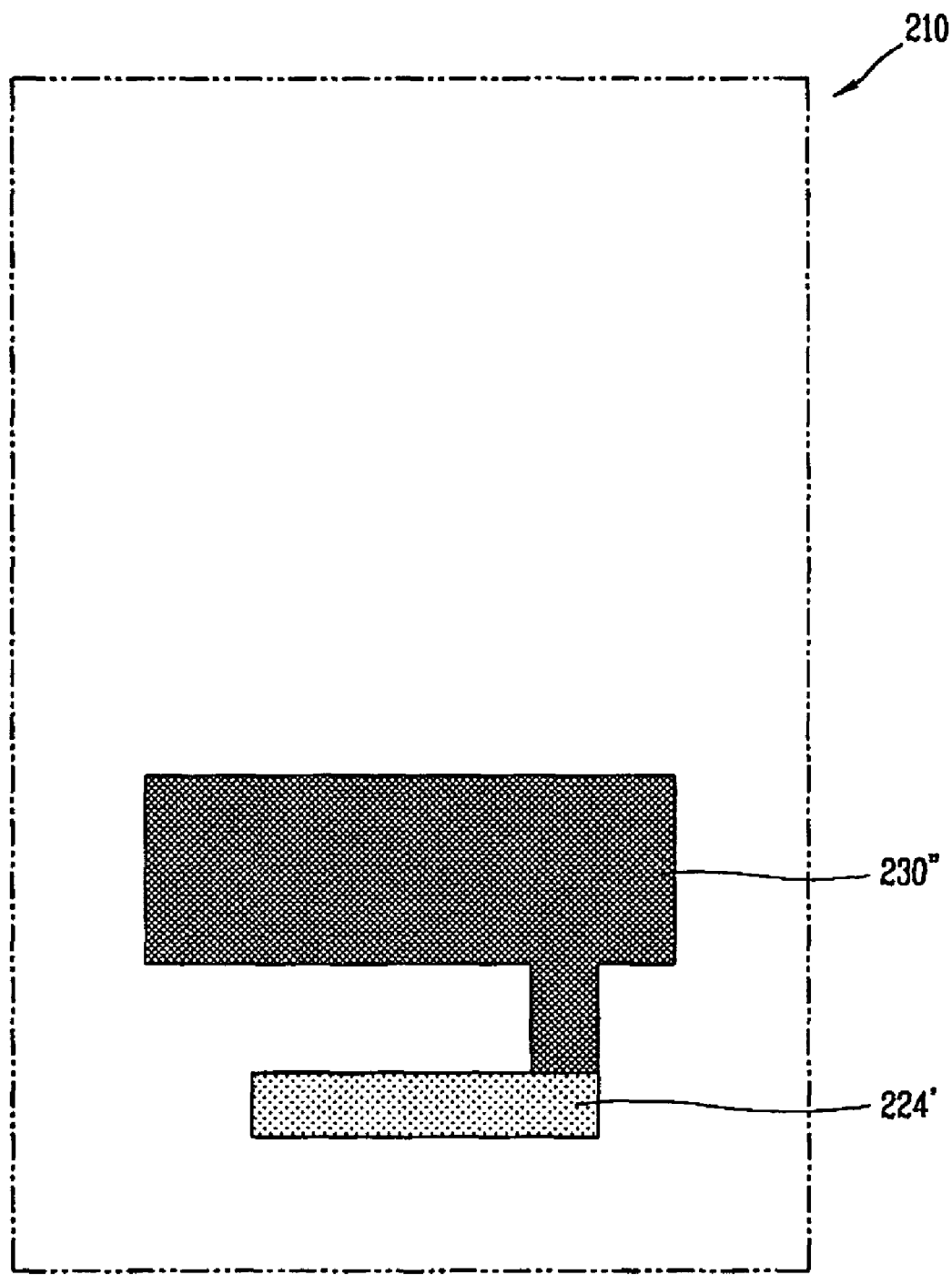
FIGS. 6A to 6D are plane views sequentially showing exemplary fabrication processes taken along line IV-IV' of the array substrate of FIG. 4.

As shown in FIGS. 5A and 6A, a buffer layer 211 and an amorphous silicon thin film are formed on a substrate 210 of a transparent insulating material such as glass. Then, the amorphous silicon thin film is crystallized to form a polycrystalline silicon thin film. The buffer layer 211 prevents impurities, such as sodium (Na), inside the substrate 210 from being introduced to an upper layer.

Then, a conductive layer is deposited on the entire surface of the substrate 210 where the polycrystalline silicon thin film is formed. Next, the polycrystalline silicon thin film and the conductive layer are selectively patterned using a photolithography process (a first mask process), thereby forming an active pattern 224' and a storage electrode 230''' on the pixel region of the array substrate 210 and forming an n-channel active pattern 224n and a p-channel active pattern 224p on the circuit region of the array substrate 210.

As aforementioned, the active patterns 224', 224n, and 224p and the storage electrode 230''' can be formed through a single mask process using a diffraction exposure, which will be explained in more detail. FIGS. 7A to 7F are sectional views showing a first mask process shown in FIGS. 5A and 6A.

Figure 7A:
FIGS. 7A to 7F are sectional views showing a first exemplary mask process shown in FIGS. 5A and 6A.

As shown in FIG. 7A, a buffer layer 211 and a silicon thin film 224 are formed on a substrate 210 formed of a transparent insulating material such as glass. A conductive layer 230 formed of Mo or Al-based conductive material on the crystallized polycrystalline silicon thin film 224.

The silicon thin film 224 can be formed of an amorphous silicon thin film or a polycrystalline silicon thin film. However, a polycrystalline silicon thin film is typically more advantageous. The polycrystalline silicon thin film can be formed by depositing an amorphous silicon thin film on the substrate and then crystallizing the amorphous silicon thin film by various methods. The amorphous silicon thin film can be deposited by various methods. Representative methods among the various methods include a low pressure chemical vapor deposition (LPCVD) and a plasma enhanced chemical vapor deposition (PECVD). The method for crystallizing the amorphous silicon thin film includes a solid phase crystallization (SPC) method for thermally processing an amorphous silicon thin film at a furnace of a high temperature, and an eximer laser annealing (ELA) method using laser. In the eximer laser annealing method, laser of a pulse type is mainly used. However, recently, a sequential lateral solidification (SLS) method for enhancing a crystallization characteristic by growing grains in a horizontal direction is being researched.

Figure 7B:
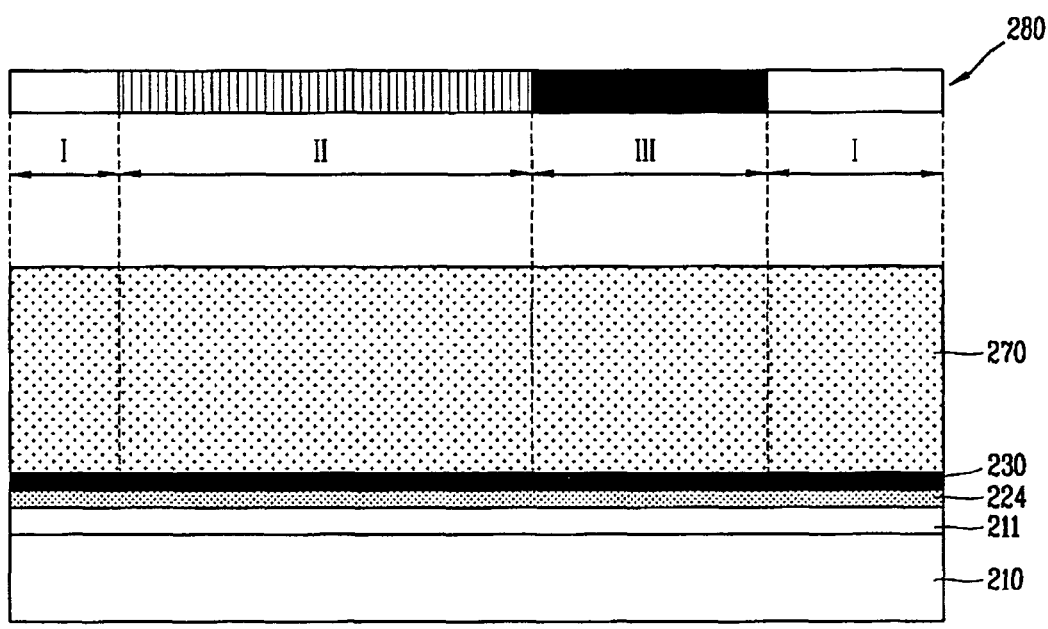

As shown in FIG. 7B, a photoresist 270 formed of a photosensitive material is deposited on an entire surface of the substrate 210. Then, light is selectively irradiated on the photoresist 270 using a diffraction mask 280. The diffraction mask 280 is provided with a transmission region I, a slit region II, and a shield region III. The transmission region I serves to completely transmit irradiated light, the slit region II serves to transmit one part of irradiated light and to shield another part of the irradiated light, and the shield region III to completely shields irradiated light. Only light having passed through the diffraction mask 280 is irradiated onto the photoresist 270. While FIG. 7B shows the use of a diffraction mask 280, a half-tone mask or any other partially transmitting mask may alternatively be used.

Figure 7C:
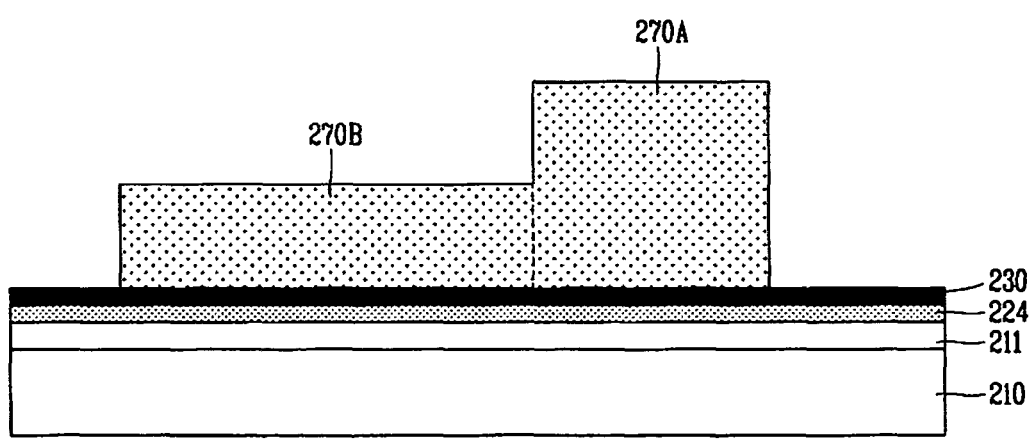

As shown in FIG. 7C, when the photoresist 270 exposed through the diffraction mask 280 is developed, a first photoresist pattern 270A and a second photoresist pattern 270B having a certain thickness remain at the shield region III and the slit region II. Also, a photoresist is completely removed at the transmission region I to expose a surface of the conductive layer 230.

The first photoresist pattern 270A formed at the shield region III has a thickness thicker than that of the second photoresist pattern 270B formed at the slit region II. Also, a photoresist formed at the transmission region I is completely removed since a positive photoresist was used. However, not only the positive photoresist but also a negative photoresist can be applied to the present invention.

Figure 7D:
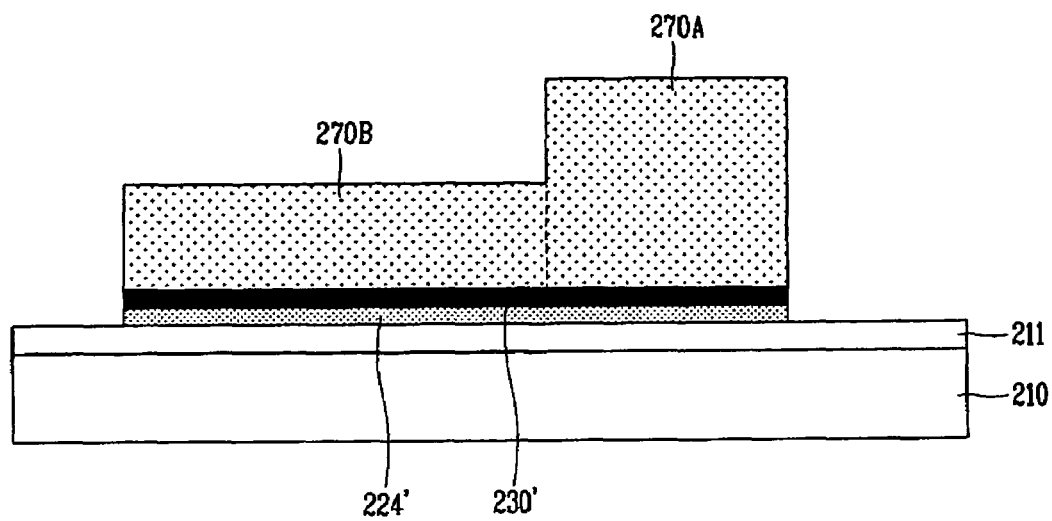

As shown in FIG. 7D, the polycrystalline silicon thin film and the conductive layer formed below the first photoresist pattern 270A and the second photoresist pattern 270B are selectively removed using the first photoresist pattern 270A and the second photoresist pattern 270B, thereby forming an active pattern 224' consisting of the polycrystalline silicon thin film on the substrate 210. A conductive layer pattern 230' formed from the conductive layer patterned to have the same pattern as the active pattern 224' remains on he active pattern 224'. Then, an ashing process for partially removing the first photoresist pattern 270A and the second photoresist pattern 270B is performed.

Figure 7E:
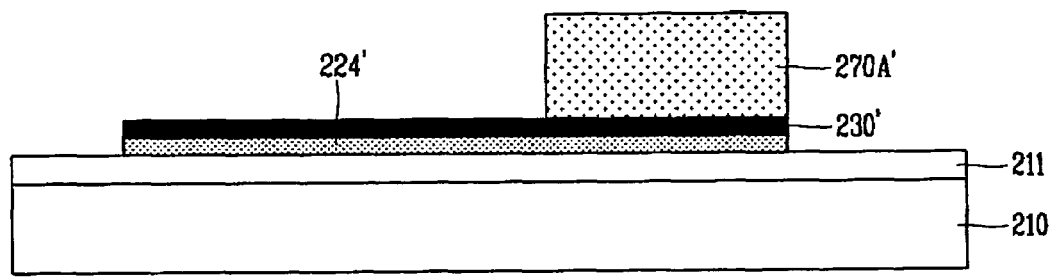

As shown in FIG. 7E, the second photoresist pattern on the active pattern 224' of the slit region II having been diffraction-exposed is completely removed to expose the surface of the conductive layer pattern 230'. The first photoresist pattern remains at the shield region III as a third photoresist pattern 270A' having a thickness obtained by removing the thickness of the second photoresist pattern from the thickness of the first photoresist pattern.

Figure 7F:
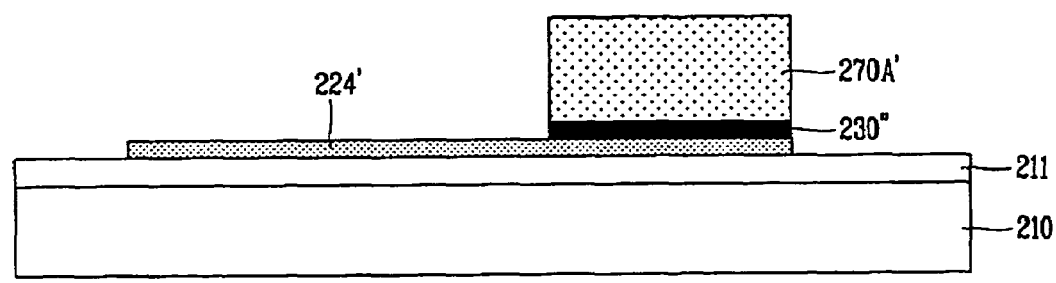

As shown in FIG. 7F, the conductive layer pattern 230' is partially removed using the third photoresist pattern 270A' as a mask, thereby forming a storage electrode 230''' consisting of the conductive layer.

Figure 5B:
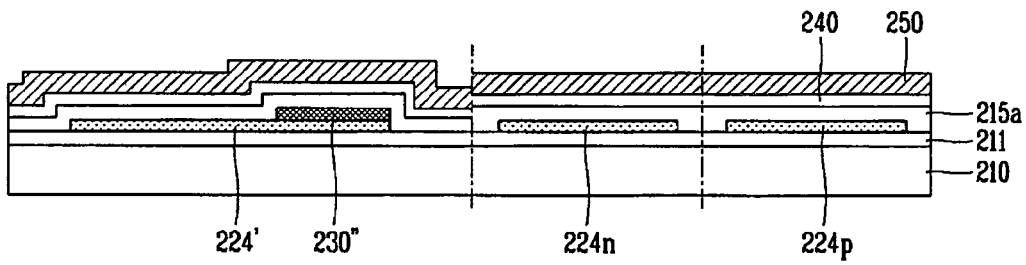

As shown in FIG. 5B, a first insulation layer 215a, a first conductive layer 240, and a second conductive layer 250 are formed on an entire surface of the substrate 210. The first conductive layer 240 to constitute the pixel electrode can be formed of a transparent conductive material having a high transmittance such as indium-tin-oxide (ITO) or indium-zinc-oxide (IZO). The second conductive layer 250 to constitute the gate electrode and the common line is formed of an opaque conductive material having a low resistance such as a aluminum (Al), aluminum alloy (Al alloy), tungsten (W), copper (Cu), chromium (Cr), molybdenum (Mo).

Figure 5C:
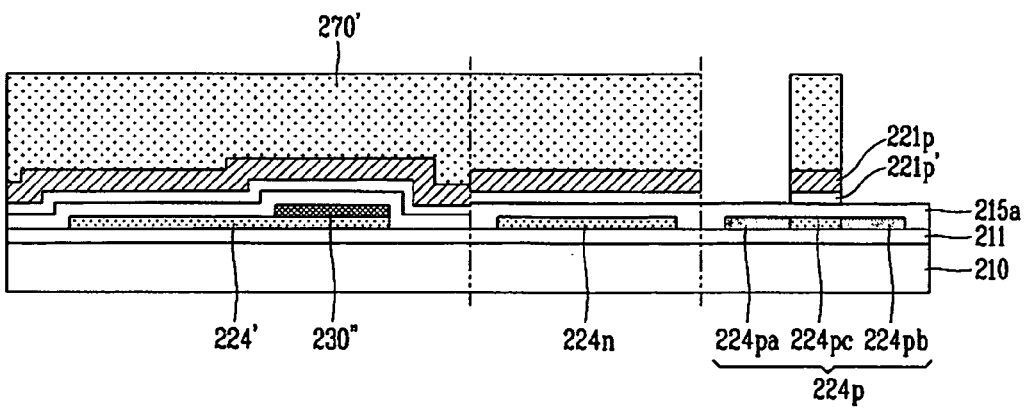

As shown in FIG. 5C, the pixel region and the n-channel TFT region of the circuit region are entirely shielded by a first shielding layer 270', and the p-channel TFT region of the circuit region is partially shielded by the first shielding layer 270' formed of a photoresist (a second mask process). Then, a first conductive layer and a second conductive layer therebelow are selectively patterned using the first shielding layer 270' as a mask, thereby forming a circuit region gate electrode 221p consisting of the second conductive layer at the p-channel TFT region of the circuit region. A gate electrode pattern 221p' consisting of the first conductive layer and patterned having the same pattern as the circuit region gate electrode 221p is formed below the circuit region gate electrode 221p.

Then, highly-concentrated p+ ions are injected into the p-channel TFT region of the circuit region using the first shielding layer 270' as a mask, thereby forming a p+ source region 224pa and a p+ drain region 224pb. A p-channel region 224pc forms a conductive channel between the p+ source region 224pa and the p+ drain region 224pb.

Figure 5D:
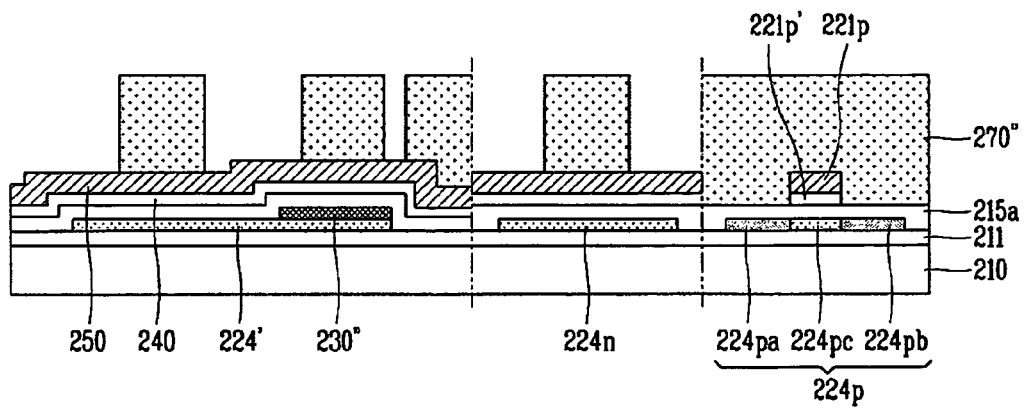
Figure 5E:
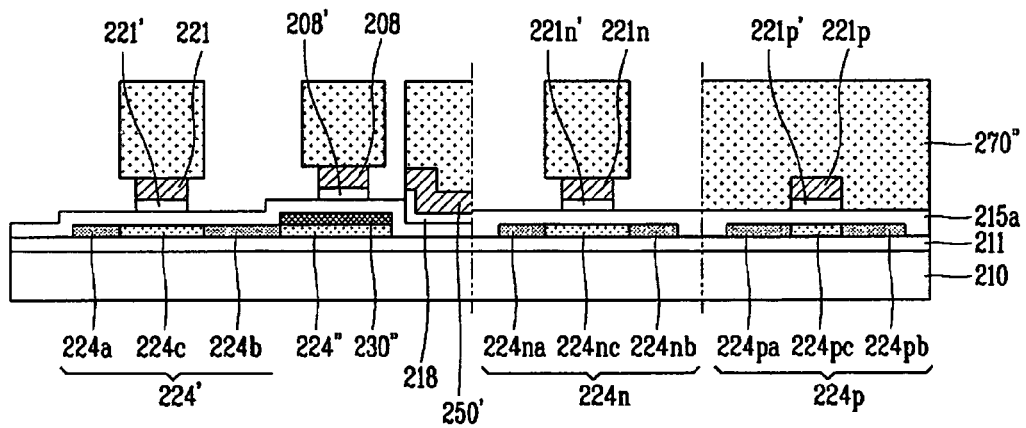
Figure 6B:
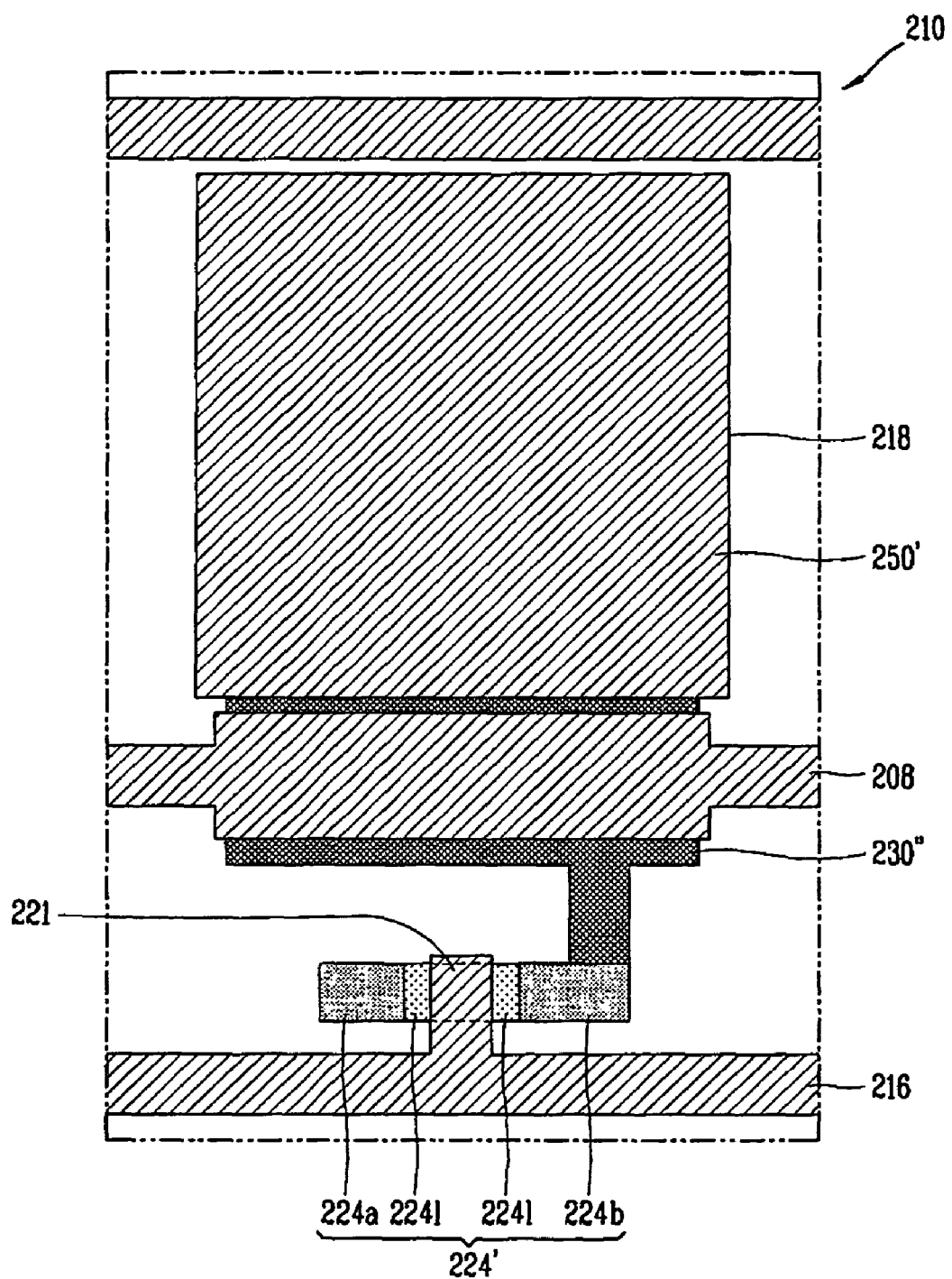

As shown in FIGS. 5D, 5E, and 6B, the p-channel TFT region of the circuit region are entirely shielded by the second shielding layer 270', and the n+ channel TFT region of the pixel region and the n+ channel TFT region of the circuit region are partially shielded by the second shielding layer 270' (a third mask process). Then, a first conductive layer and a second conductive layer therebelow are selectively patterned using the second shielding layer 270' as a mask, thereby forming a circuit region gate electrode 221, a gate line 216, and a circuit region gate electrode 221n consisting of the second conductive layer at the n– channel TFT region of the pixel region and the n-channel TFT region of the circuit region. Accordingly, a common line 208 is formed on the storage electrode 230". Below the pixel region gate electrode 221 and the circuit region gate electrode 221n, formed are a pixel region gate electrode pattern 221' and a circuit region gate electrode pattern 22 In' consisting of the first conductive layer and patterned to have the same pattern as the pixel region gate electrode 221 and the circuit region gate electrode 221n.

A pixel electrode 218 consisting of the first conductive layer is formed at the pixel region by using the second shielding layer 270'. Also, a second conductive layer pattern 250' consisting of the second conductive layer and patterned to have the same pattern as the pixel electrode 218 remains on the pixel electrode 218. The gate electrodes 221, 221n, 221p, the gate line 216, the storage electrode 230", and the pixel electrode 218 have widths less than a width of the second shielding layer 270' by over-etching the second conductive layer by a wet-etching method. The common line 208 of the pixel region overlaps the storage electrode 230" therebelow with the first insulation layer 215a being interposed therebetween, thereby forming a first storage capacitor.

A highly-concentrated n+ ion is injected into the n+ channel TFT regions of the pixel region and the circuit region using the second shielding layer 270' as a mask, thereby forming n+ source regions 224a and 224na and n+ drain regions 224b and 224nb. The n-channel regions 224c and 224nc form conductive channels between the n+ source regions 224a and 224na and the n+ drain regions 224b and 224nb.

Figure 5F:
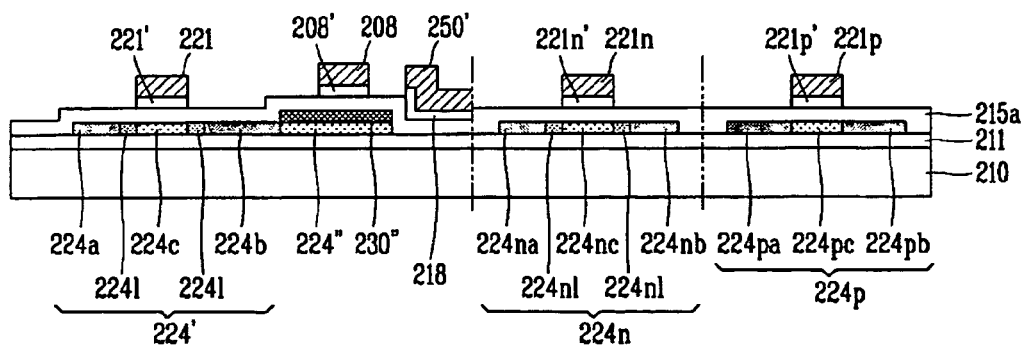

As shown in FIG. 5F, the second shielding layer 270' is removed and then n-ions of a low concentration are injected into the entire surface of the substrate 210, thereby forming lightly doped drain (LDD) regions 2241 between the n+ source regions 224a and 224na and the channel regions 224c and 224nc and between the n+ drain regions 224b and 224nb and the channel regions 224c and 224nc.

Figure 5G:
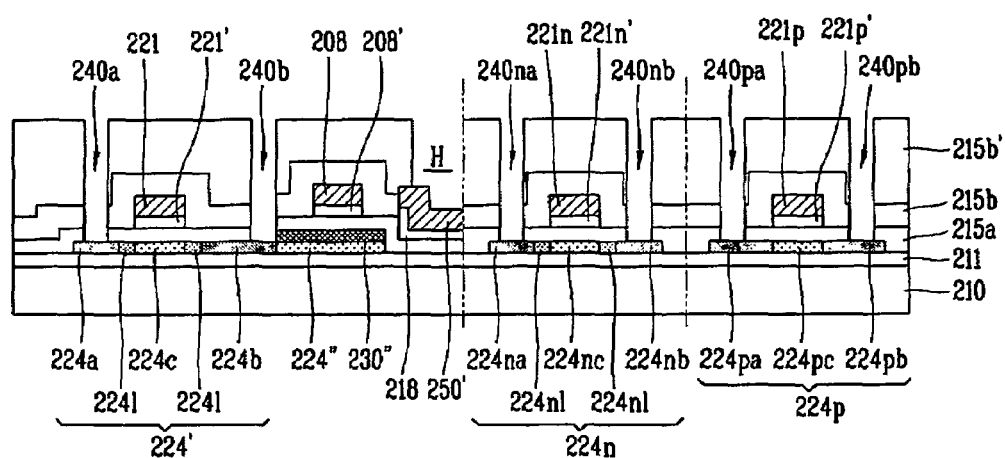
Figure 6C:
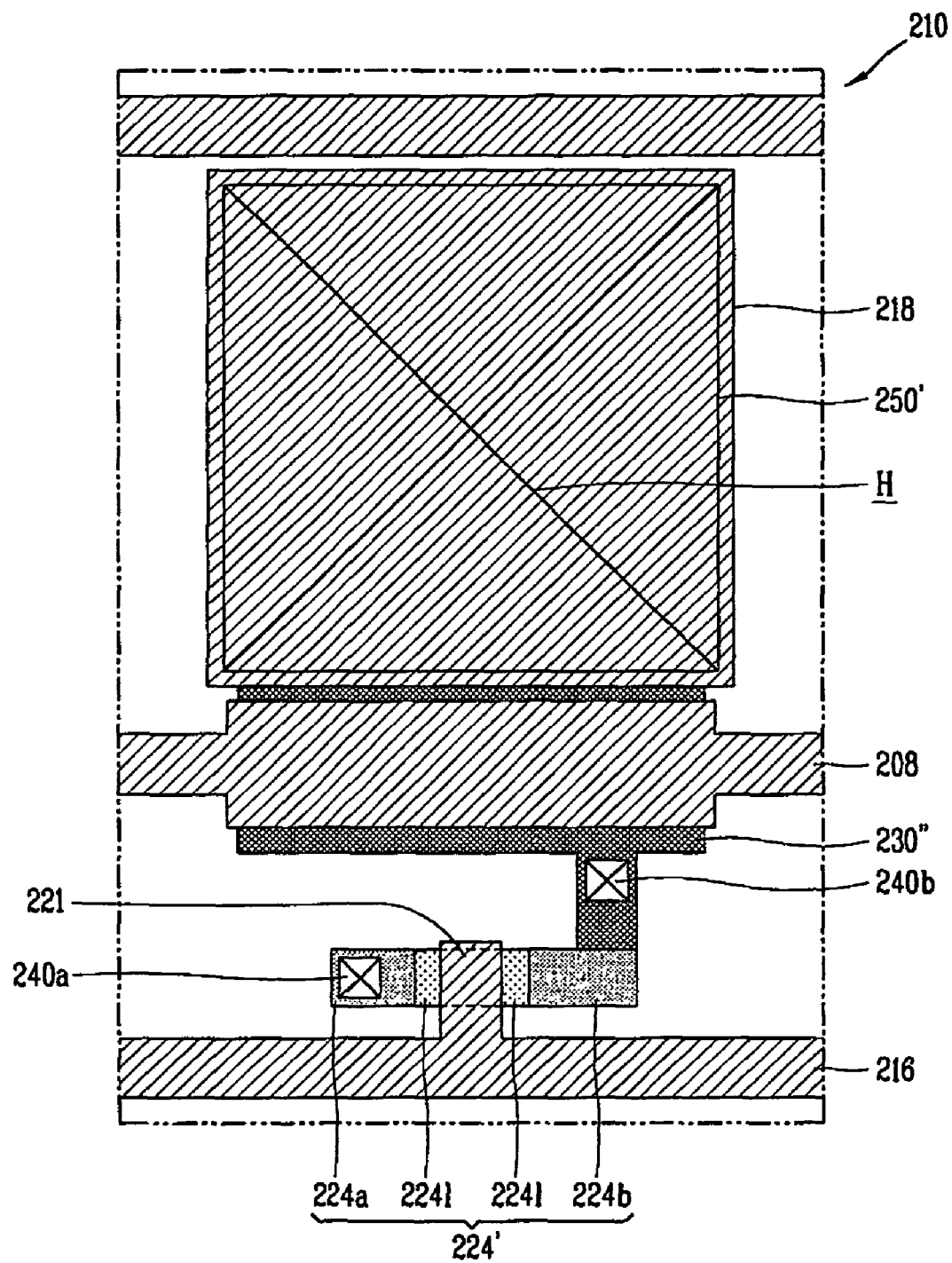

As shown in FIGS. 5G and 6C, a first inter-insulation layer 215b and a second inter-insulation layer 215b' are deposited on an entire surface of the substrate 210 and then partially removed by a photolithography process (a fourth mask process), thereby forming first contact holes 240a, 240na, and 240pa for partially exposing the source regions 224a, 224na, and 224pa and forming second contact holes 240b, 240nb, and 240pb for partially exposing the drain regions 224b, 224nb, and 224pb. The first inter-insulation layer 215b and the second inter-insulation layer 215b' above the pixel electrode 218 are removed by the fourth mask process, thereby forming a hole H for opening the pixel region. At the time of forming the hole H, the first inter-insulation layer 215b and the second inter-insulation layer 215b' are removed towards inside of the second conductive layer pattern 250' and the pixel electrode 218, thereby partially covering the second conductive layer pattern 250' and the pixel electrode 218 by the first inter-insulation layer 215b and the second inter-insulation layer 215b'.

The first inter-insulation layer can be formed of a double-layer consisting of $SiN_x/SiO_2$. It is possible to perform an activation thermal annealing after depositing the $SiO_2$ or to perform a hydrogenation thermal annealing after depositing the $SiN_x$. It is also possible to simultaneously perform hydrogenation and activation by a single thermal annealing after depositing the $SiN_x$ and $SiO_2$. The first inter-insulation layer 215b can be formed of a single layer of $SiN_x$ or a triple-layer consisting of $SiO_2/SiN_x/SiO_2$, etc. The second inter-insulation layer 215b' can be formed of an organic insulation layer having a low dielectric constant such as a benzocyclobuten or acryl resin. However, the second inter-insulation layer 215b' can be formed of the same inorganic insulation layer as that of the first inter-insulation layer 215b. Alternatively, the second inter-insulation layer 215b' may be formed of silicon oxide.

At the time of forming the second contact hole 240b of the pixel region, both the drain region 224b of the pixel region and the storage electrode 230" can be partially exposed together with each other. The drain region 224b of the pixel region and the storage electrode 230" can be partially exposed separately from each other by forming two second contact holes and then connecting to a drain electrode through the contact holes.

Figure 5H:
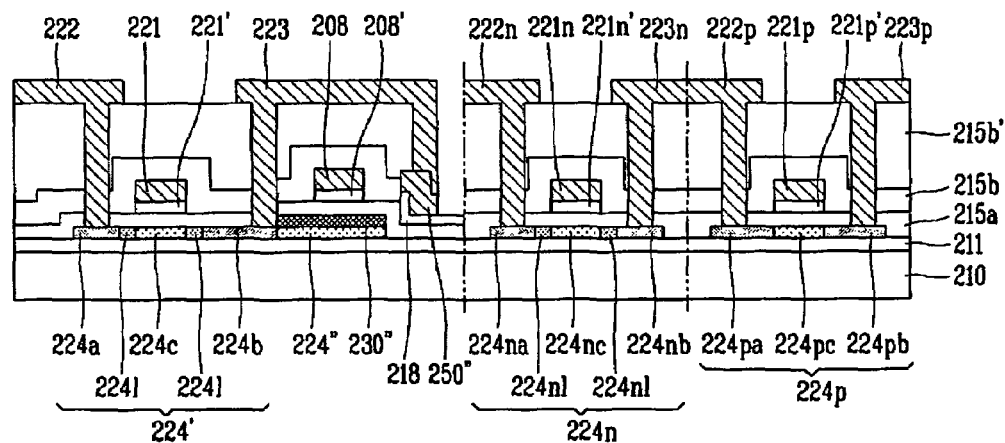
Figure 6D:
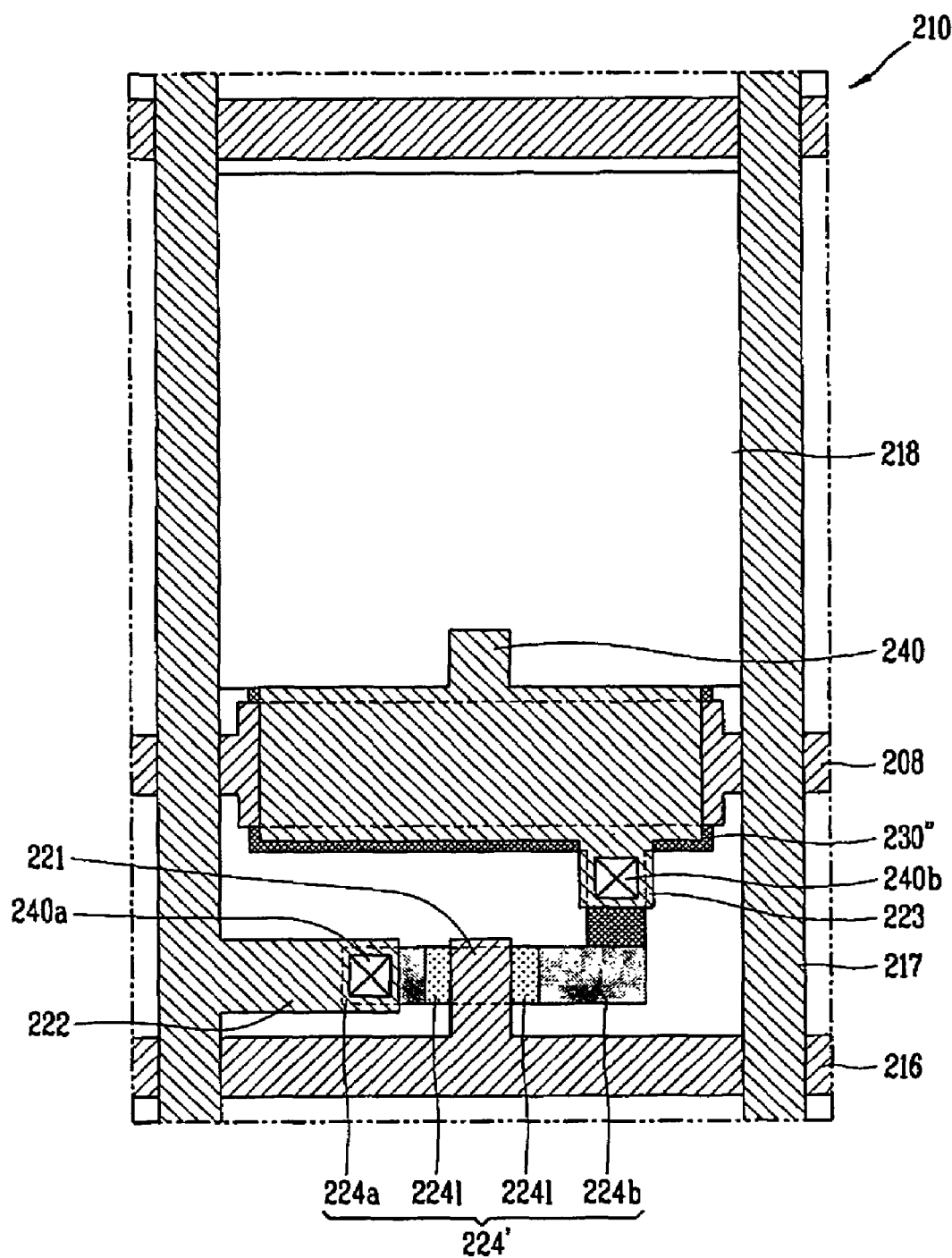

As shown in FIGS. 5H and 6D, a third conductive layer is deposited on an entire surface of the substrate 210 and then selectively patterned using a photolithography process (a fifth mask process), thereby forming source electrodes 222, 222n, and 222p electrically connected to the source regions 224a, 224na, and 224pa through the first contact holes 240a, 240na, and 240pa, and forming drain electrodes 224b, 224nb, and 224pb electrically connected to the drain regions 224b, 224nb, and 224pb through the second contact holes 240b, 240nb, and 240pb. Herein, a portion of the source electrode 222 of the pixel region extends in one direction to be a part of the data line 217. Also, a portion of the drain electrode 223 of the pixel region extends towards the pixel region to overlap the common line 208 formed therebelow with the first inter-insulation layer 215b and the second inter-insulation layer 215b' being interposed therebetween, thereby constituting a second storage capacitor. Also, a portion of the drain electrode 223 extends towards the pixel region to constitute a protrusion region 240. The drain electrode is directly connected to the second conductive layer pattern 250' formed therebelow to be electrically connected to the pixel electrode 218 through the protrusion region 240.

The third conductive layer of the pixel region and the second conductive layer pattern formed therebelow are selectively patterned through the fifth mask process, thereby exposing the pixel electrode 218 of the pixel region outwardly. Herein, the patterning can be performed so that the second conductive layer pattern 250" can remain on an upper edge of the pixel electrode 218 to obtain a processing margin. In the array substrate according to the second exemplary embodiment of the present invention, the active pattern 224' and the storage electrode 230" are formed through a single mask process. Also, the pixel electrode 218 is simultaneously patterned at the time of patterning gate lines, and the pixel region is opened at the time of forming data lines to expose the pixel electrode outwardly. Accordingly, the driving circuit integrated array substrate for an LCD device can be fabricated through five mask processes.

According to the second exemplary embodiment of the present invention, the second inter-insulation layer 215b' is formed of an organic material having a low dielectric constant so that the pixel electrode 218 can partially overlap the data line 217. Accordingly, an aperture ratio is enhanced.

Figure 8:
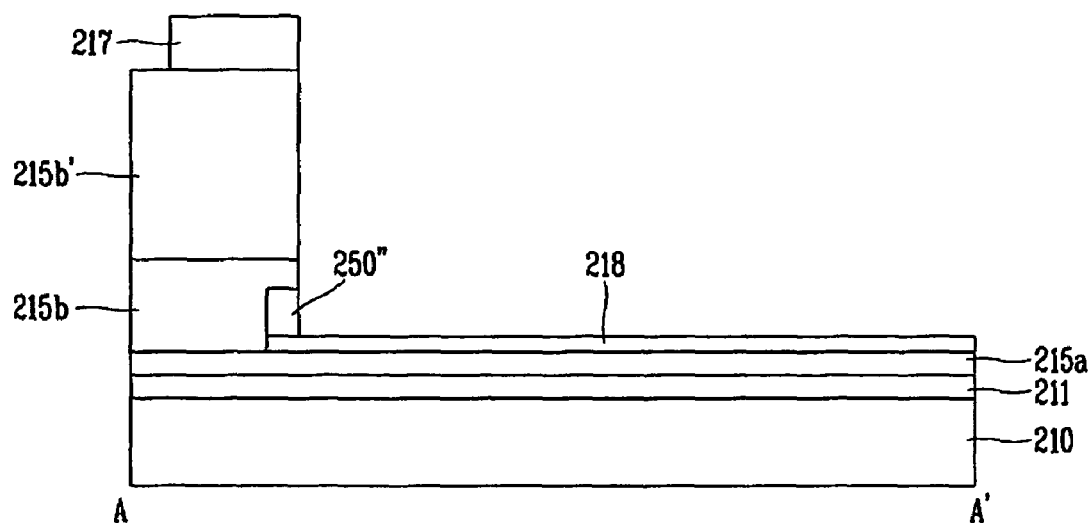
FIG. 8 is a sectional view taken along line A-A' of the array substrate of FIG. 4.

FIG. 8 is a sectional view taken along line A-A' of the array substrate of FIG. 4, in which the second inter-insulation layer is formed of an organic material.

As shown, a pixel electrode 218 according to the second exemplary embodiment is formed on a first insulation layer 215a, and a second conductive layer pattern 250" consisting of a second conductive layer remains on an upper edge of the pixel electrode 218. On the second conductive layer pattern 250", a first inter-insulation layer 215b and a second inter-insulation layer 215b' are sequentially formed. The first inter-insulation layer 215b is formed of an inorganic material, and the second inter-insulation layer 215b' is formed of an organic material. A data line 217 can partially overlap the pixel electrode 218 by forming the second inter-insulation layer 215b' with an organic material having a low dielectric constant. As the result, an aperture ratio of the pixel region is enhanced.

Figure 9:
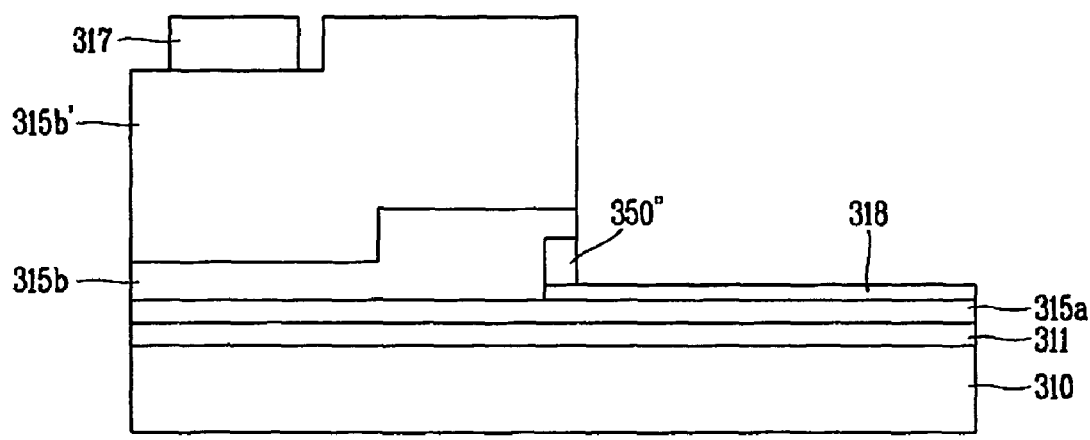
FIG. 9 is a sectional view schematically showing an array substrate of an LCD device according to a third exemplary embodiment of the present invention.

The second inter-insulation layer can be formed of the same inorganic material as that of the first inter-insulation layer, which will now be explained in detail. FIG. 9 is a sectional view schematically showing an array substrate of an LCD device according to a third exemplary embodiment of the present invention, in which a second inter-insulation layer is formed of an inorganic material.

As shown, a pixel electrode 318 according to the third exemplary embodiment is formed on a first insulation layer 315a, and a second conductive layer pattern 350" consisting of a second conductive layer remains on an upper edge of the pixel electrode 318. On the second conductive layer pattern 350", a first inter-insulation layer 315b and a second inter-insulation layer 315b' are sequentially formed. The first inter-insulation layer 315b and the second inter-insulation layer 315b' are formed of an inorganic material.

As the first inter-insulation layer 315b and the second inter-insulation layer 315b' are formed of an inorganic material, a data line 317 can be spaced from the pixel electrode 318. Here, the data line 317 is spaced from the pixel electrode 318 is to prevent signal interference due to a parasitic capacitance generated between the data line 317 and the pixel electrode 318. The parasitic capacitance depends on an insulating material interposed between the data line 317 and the pixel electrode 318, that is, a dielectric constant between the first inter-insulation layer 315b and the second inter-insulation layer 315b'. When the first inter-insulation layer 315b and the second inter-insulation layer 315b' are formed of an inorganic material having a larger dielectric constant than that of an organic material, a size of the parasitic capacitance generated between the data line 317 and the pixel electrode 318 is increased. To prevent the parasitic capacitance from being increased, the data line 317 is formed to be spaced from the pixel electrode 318 formed therebelow.

Of course other variations in accordance with the present invention can be used. For example, the inter-insulating layer may be a single layer. In another exemplary alternative, the first and second inter-insulation layers could be formed thicker with the data line over the pixel electrode in a manner similar to the structure of FIG. 8.

The array substrate according to the present invention is bonded to the color filter substrate by a seal pattern formed at an outer periphery of an image display region by a bonding key. In the bonded structure, liquid crystal material is disposed between the array substrate and the color filter substrate.

It will be apparent to those skilled in the art that various modifications and variations can be made in the liquid crystal display device and method for fabricating the same of the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display (LCD) device, comprising:
    forming active patterns respectively on a pixel region, a first circuit region, and a second circuit region of a first substrate and forming a storage electrode formed of a conductive material on the active pattern of the pixel region using a single mask,
    forming a first insulation layer on the first substrate having the active patterns and the storage electrode;
    forming a first conductive layer and a second conductive layer on the first insulation layer;
    patterning the first and second conductive layers in the first circuit region to form a first gate electrode from the second conductive layer;
    injecting highly-concentrated p+ions into the active region of the first circuit region to form p+source/drain regions in the active pattern of the first circuit region;
    patterning the first and second conductive layers using a single mask to form a second gate electrode from the second conductive layer in the second circuit region, a common line from the second conductive layer in the pixel region and a pixel electrode from the first conductive layer in the pixel region;
    forming n+source/drain regions in the active patterns of the pixel region and the second circuit region;
    forming a first inter-insulation layer and a second inter-insulation layer on the first substrate having the first gate electrode, the second gate electrode, the common line, and the pixel electrode,
    wherein a second conductive layer pattern formed of the second conductive layer remains on an upper surface of the pixel electrode, and
    wherein the common line overlaps the storage electrode with the first insulation layer being interposed therebetween to define a first storage capacitor;

forming first contact holes to expose the source regions of the active pattern at the pixel region, the first circuit region and the second circuit region by partially removing the first insulation layer, the first inter-insulation layer, and the second inter-insulation layer;

forming second contact holes to expose the drain regions of the active pattern at the pixel region, the first circuit region and the second circuit region by partially removing the first insulation layer, the first inter-insulation layer, and the second inter-insulation layer;

forming source electrodes electrically connected to the source regions of the active patterns at the pixel region, the first circuit region and second circuit region through the first contact holes, respectively;

forming drain electrodes electrically connected to the drain regions of the active patterns at the pixel region, the first circuit region and second circuit region through the second contact holes, respectively, wherein a portion of the drain electrode extending towards the pixel region overlaps the common line with the first inter-insulation layer and the second inter-insulation layer being interposed therebetween to define a second storage capacitor;

forming a data line partially overlapping the pixel electrode on the second inter-insulation layer; and bonding the first substrate with a second substrate such that a liquid crystal layer is disposed therebetween.

2. The method of claim 1, wherein in the step of forming the first contact holes and the second contact holes, an opening is formed at the same time to open the pixel region by partially removing the first inter-insulation layer and the second inter-insulation layer.

3. The method of claim 1, wherein the step of forming the active patterns and simultaneously forming the storage electrode includes using a diffraction mask.

4. The method of claim 1, wherein the step of forming the active patterns and simultaneously forming the storage electrode includes using a half-tone mask.

5. The method of claim 1, wherein the active patterns of the pixel region, the first circuit region and the second circuit region are formed of a polycrystalline silicon thin film.

6. The method of claim 1, wherein both sides of the data line partially overlap the pixel electrode on the second inter-insulation layer.

7. The method of claim 1, wherein the step of injecting highly-concentrated p+ions includes injecting highly-concentrated p+ions into the first circuit region using the first gate electrode as a mask to forming p+source/drain regions in the active pattern of the first circuit region at portions adjacent to the first gate electrode.

8. The method of claim 1, wherein the step of forming the first gate electrode on the first circuit region includes:

entirely shielding the pixel region and the second circuit region and partially shielding the first circuit region with a first shielding layer; and selectively removing the first and second conductive layers using the first shielding layer as a mask to form the first gate electrode.

9. The method of claim 8, wherein the step of patterning the first and second conductive layers to form the second gate electrode, the common line and the pixel electrode includes:

entirely shielding the first circuit region and partially shielding the pixel region and the second circuit region with a second shielding layer;

selectively removing the first and second conductive layers using the second shielding layer as a mask to form the second gate electrode, the common line and the pixel electrode.

10. The method of claim 8, wherein the step of patterning the first and second conductive layers to form the second gate electrode, the common line and the pixel electrode, includes forming a third gate electrode from the second conductive layer in the pixel region.

11. The method of claim 8, wherein, in the step of selectively removing the first and second conductive layers using the second shielding layer, the second gate electrode and the common line are over-etched using a wet-etching process to have widths less than that corresponding portions of the second shielding layer over the second gate electrode and the common line.

12. The method of claim 8, wherein the step of patterning the first and second conductive layers to form the second gate electrode, the common line and the pixel electrode further includes:

removing the second shielding layer; and injecting n– ions of a low concentration into the active patterns of the pixel region and the second circuit region to form a lightly doped drain (LDD) regions in the active patterns of the pixel region and the second circuit region.

13. The method of claim 1, wherein the first inter-insulation layer includes an inorganic material.

14. The method of claim 1, wherein the first inter-insulation layer includes at least two layers with at least one layer having silicon nitride.

15. The method of claim 1, wherein the second inter-insulation layer includes an organic material.

16. The method of claim 1, wherein the second inter-insulation layer includes an inorganic material.

17. The method of claim 1, wherein the second contact hole of the pixel region simultaneously exposes portions of the storage electrode and the drain region of the pixel region.

18. The method of claim 1, wherein a second conductive layer pattern formed of the second conductive layer remains on an upper edge of the pixel electrode.

19. The method of claim 18, wherein on the second conductive layer pattern, the first inter-insulation layer and the second inter-insulation layer are sequentially formed.

20. The method of claim 19, wherein the pixel electrode is formed using the same mask process as used for forming the source/drain electrodes of the pixel region.

21. The method of claim 19, wherein a portion of the second conductive layer pattern on the pixel region is removed to expose the pixel electrode at the same time as patterning the data lines.

22. The method of claim 1, wherein the first conductive layer includes a transparent conductive material having a high transmittance.

23. The method of claim 1, wherein the second conductive layer includes an opaque conductive material having a low resistance.

* * * * *